United States Patent
Hung

(10) Patent No.: US 10,898,296 B2
(45) Date of Patent: Jan. 26, 2021

(54) MASTICATORY ORTHODONTIC CORRECTION DEVICE AND METHOD FOR MAKING THE SAME

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 338 days.

(21) Appl. No.: 15/961,728

(22) Filed: Apr. 24, 2018

(65) Prior Publication Data

US 2018/0303582 A1 Oct. 25, 2018

(30) Foreign Application Priority Data

Apr. 25, 2017 (EP) .................................... 17168017

(51) Int. Cl.
*A61C 7/00* (2006.01)
*A61C 7/08* (2006.01)
*A61C 7/36* (2006.01)
*A61C 9/00* (2006.01)

(52) U.S. Cl.
CPC ............... *A61C 7/002* (2013.01); *A61C 7/08* (2013.01); *A61C 7/36* (2013.01); *A61C 9/004* (2013.01)

(58) Field of Classification Search
CPC .. A61C 7/002; A61C 7/08; A61C 7/36; A61C 7/00; A61C 9/004; A61C 5/007
USPC .......................................................... 433/24
See application file for complete search history.

(56) References Cited

U.S. PATENT DOCUMENTS

| 9,351,809 | B2 * | 5/2016 | Phan ........................ A61C 7/36 |
| 2003/0224312 | A1 * | 12/2003 | Bergersen .............. A61C 7/002 |
| | | | 433/6 |
| 2007/0065768 | A1 * | 3/2007 | Nadav .................... A61C 7/008 |
| | | | 433/6 |
| 2010/0129763 | A1 * | 5/2010 | Kuo ......................... A61C 7/08 |
| | | | 433/6 |
| 2017/0007364 | A1 * | 1/2017 | Wu .......................... A61C 7/08 |

FOREIGN PATENT DOCUMENTS

| CA | 2928275 A1 | 10/2016 | |
| EP | 3238654 A1 * | 11/2017 | ............. A61C 7/002 |
| ES | 2364165 A1 * | 8/2011 | ............. A61C 7/002 |
| JP | 2008-22907 A | 2/2008 | |
| JP | 2009-201916 A | 9/2009 | |
| JP | 2016-202921 | 12/2016 | |

(Continued)

OTHER PUBLICATIONS

Machine Translation of ES-2364165-A1 (Year: 2011).*

(Continued)

*Primary Examiner* — Matthew M Nelson

(57) ABSTRACT

A method of making a dental appliance for repositioning a patient's teeth includes forming a rigid shell that is configured to receive the patient's teeth of a dental arch. The rigid shell has at least one first cavity with a space for accommodating at least one first tooth of the dental arch needing orthodontic correction and allowing the first tooth to move from an initial tooth arrangement to a target tooth arrangement. The method also includes forming at least one resilient member in the first cavity of the rigid shell. The resilient member has a receiving shape fitting the first tooth in the target tooth arrangement.

14 Claims, 9 Drawing Sheets

(56) References Cited

FOREIGN PATENT DOCUMENTS

TW           201637625 A    11/2016
WO    WO 2009/017826 A1     2/2009

OTHER PUBLICATIONS

European Patent Office, European Search Report, Patent Application Serial No. 17168017.6, dated Sep. 6, 2017, Europe.
Intellectual Property Office of the Philippines, Formality Examination Report, Patent Application Serial No. 1/2018/000114, dated Aug. 1, 2018, Philippines.
Taiwan Patent Office, Office Action, Patent Application Serial No. 107114015, dated Oct. 2, 2018, Taiwan.
Japan Patent Office, Office Action, Patent Application Serial No. 2018-082735, dated May 21, 2019, Japan.

* cited by examiner

MASTICATORY ORTHODONTIC CORRECTION DEVICE AND METHOD FOR MAKING THE SAME

CROSS REFERENCE TO RELATED APPLICATIONS

The present application claims priority of European Patent Application No. EP17168017.6, filed on Apr. 25, 2017, the entirety of which is incorporated by reference herein.

BACKGROUND OF THE INVENTION

Field of the Invention

The present application relates to an orthodontic correction technology, and in particular to a masticatory orthodontic correction device and a method for making the same.

Description of the Related Art

When a person's teeth are in misalignment, his dental aesthetics, functions and health may be adversely affected. Affected functions include daily activities, such as chewing, pronunciation, and breathing. Induced dental health problems include dental cavities, periodontal disease and excessive wear of teeth. The goal of orthodontic correction is to reposition or realign the teeth of a patient to positions and orientations where the dental functions are improved.

Conventional braces use an archwire as the force-inducing appliance. The archwire is pre-shaped and interconnects the teeth through brackets that are fixed to the teeth. When initially installed, the archwire elastically deforms to accommodate the teeth in malposition to exert resilient corrective forces on them. The archwire exerts continuous forces on the teeth to gradually urge them to their finish positions. Making use of the appliance's own resilient property is also the working principle with aligners. The body or shell of clear aligners used in prior art is flexible and deforms when the appliance is worn, providing resilient corrective force as it tries to return to its original shape. When a clear aligner is worn on misaligned teeth, it is elastic and tries to accommodate the misaligned teeth, but does not fully contact the surfaces of the teeth. Thus, additional parts fixed to the teeth, such as attachments are needed to allow the aligner body to better engage the misaligned teeth to apply resilient force. Clear aligners are required to be worn over 20 hours per day (except when the patient is eating) in order to provide continuous corrective force to achieve orthodontic results.

Clear aligners have the advantage of being less visible and removable. A patient removable appliance promotes better oral hygiene as the patient can more easily clean the teeth and the appliance. However, using clear aligners with attachments fixed on misaligned teeth can be more painful for patients. It is recognized in orthodontic practice that light, intermittent forces are preferable to heavy, continuous forces in making the teeth move faster through the alveolar bone and reduce risks of root resorption.

BRIEF SUMMARY OF THE INVENTION

In view of the aforementioned problems, an object of the invention is to provide a novel orthodontic correction device which relies on intermittent short-duration occlusal forces generated during mastication for the orthodontic correction force (hereinafter referred to as a "masticatory orthodontic correction device"), thereby reducing the time and discomfort of wearing the device while accelerating orthodontic tooth movement. In particular, the dental appliance(s) used in the masticatory orthodontic correction device includes a rigid shell that is not deformed or flexible even under loading from occlusal forces, and the dental appliance(s) is a patient removable appliance.

In accordance with some embodiments of the invention, a method of making a dental appliance for repositioning a patient's teeth is provided, including forming a rigid shell that is configured to receive the patient's teeth of a dental arch. The rigid shell has at least one first cavity with a space for accommodating at least one first tooth of the dental arch needing orthodontic correction and allowing the first tooth to move from an initial tooth arrangement to a target tooth arrangement. The method also includes forming at least one resilient member in the first cavity of the rigid shell. The resilient member has a receiving shape fitting the first tooth in the target tooth arrangement.

In accordance with some embodiments of the invention, a dental appliance for repositioning a patient's teeth is provided, including a rigid shell and at least one resilient member. The rigid shell is configured to receive the patient's teeth of a dental arch, wherein the rigid shell has at least one first cavity with a space for accommodating at least one first tooth of the dental arch needing orthodontic correction and allowing the first tooth to move from an initial tooth arrangement to a target tooth arrangement. The resilient member is formed in the first cavity and having a receiving shape fitting the first tooth in the target tooth arrangement for guiding the first tooth from the initial tooth arrangement to the target tooth arrangement.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
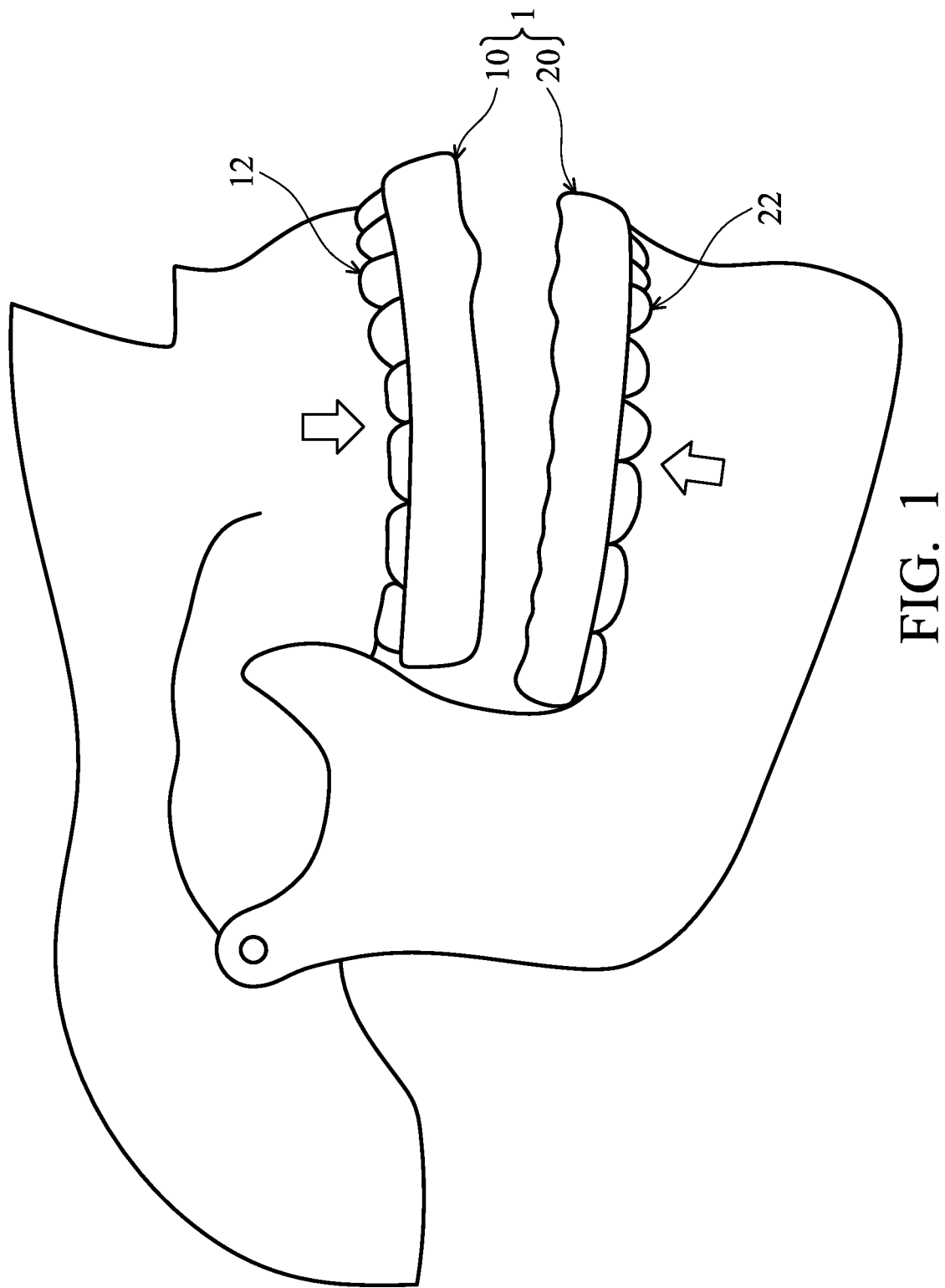
FIG. 1 is a schematic view showing a masticatory orthodontic correction device according to some embodiments of the invention, wherein a patient can wear it to masticate.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

Furthermore, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic view showing a masticatory orthodontic correction device according to some embodiments of the invention, wherein a patient can wear it to masticate. As shown in FIG. 1, the masticatory orthodontic correction device 1 includes a first dental appliance 10 having a rigid shell and a second dental appliance 20 having a rigid shell, wherein the first and second dental appliances 10 and 20 are removably worn on the maxillary dental arch 12 and the mandibular dental arch 22 of a patient, respectively. Being patient removable, the masticatory orthodontic correction device 1 is to be worn during mastication, occurring in daily activities such as eating food and chewing gum.

It should be appreciated that when a patient wears the first and second dental appliances 10 and 20, loading on the teeth from the occlusion of the maxillary and mandibular dental arches 12 and 22 (as the arrows indicate in FIG. 1) during mastication is a driving force that enables the masticatory orthodontic correction device 1 to function as an orthodontic correction device. In particular, the rigid shells of the first and second dental appliances 10 and 20 do not deform or apply resilient force against teeth, and their shapes are maintained without deformation when accommodating teeth even under loading from occlusal forces. This is in contrast with the case of clear aligners used in prior art, wherein the body or shell of the clear aligner is flexible and deforms when worn on teeth in malposition, using the resilient force of the aligner body or shell as the orthodontic correction force. The design and making of the appliances 10 and 20 are described in following paragraphs.

Figure 2:
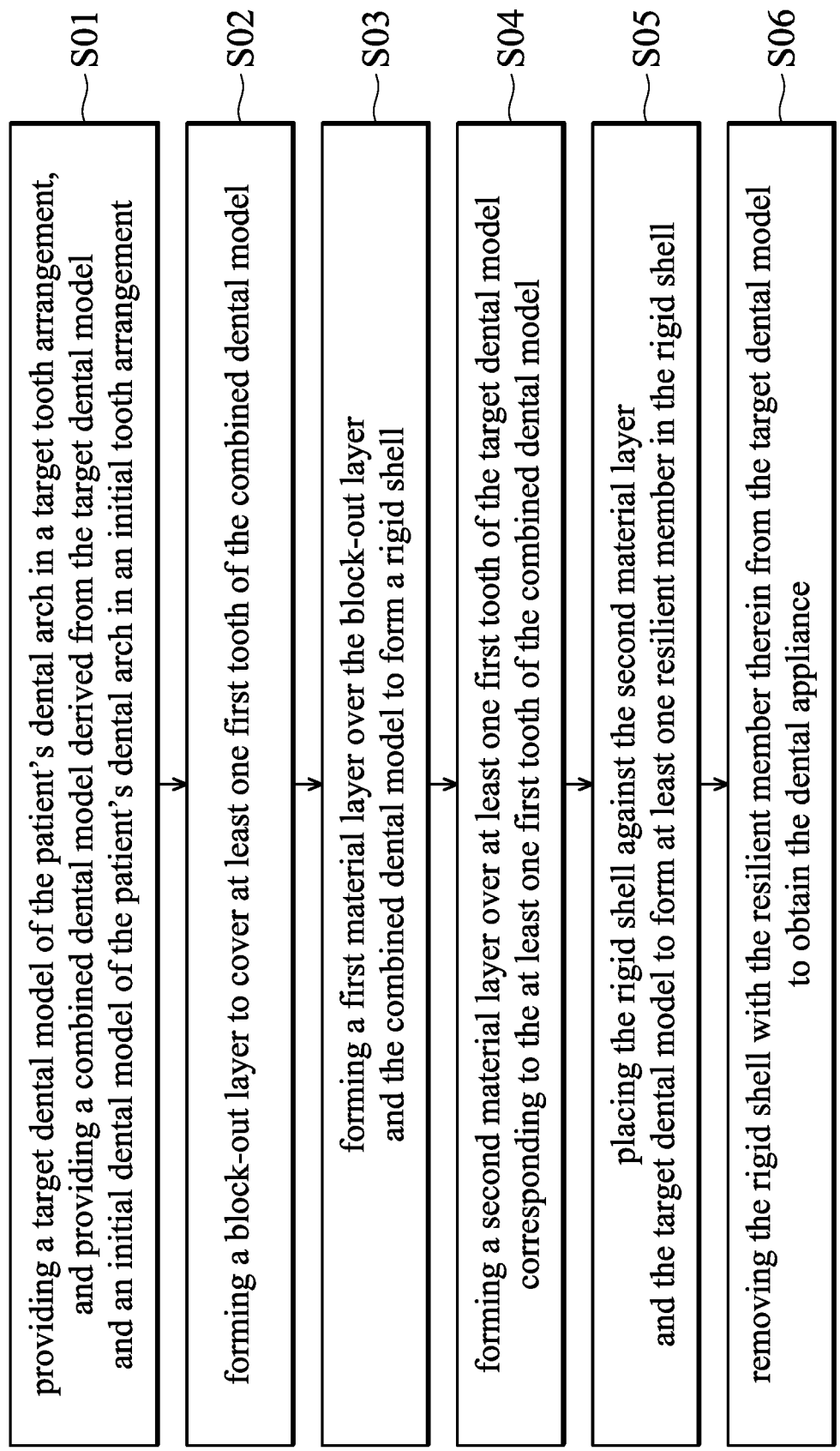
FIG. 2 is a flow chart of a method of making the dental appliance used in the masticatory orthodontic correction device, in accordance with some embodiments of the invention.
Figure 4:
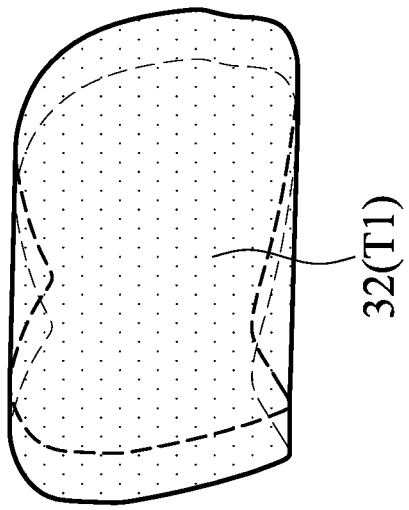
FIG. 4 is a schematic cross-sectional view of a portion of a combined dental model derived from the initial dental model and the target dental model in FIG. 3.
Figure 3:
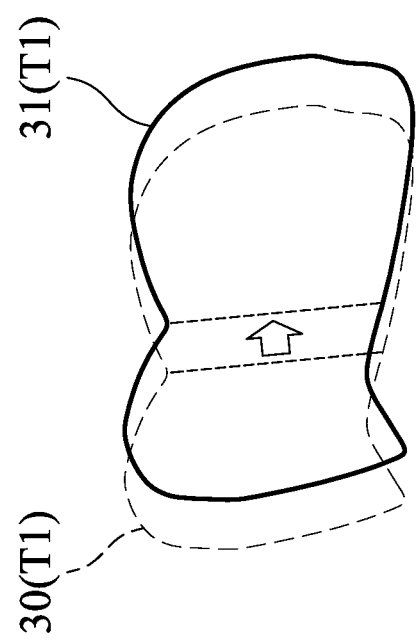
FIG. 3 is a schematic cross-sectional view of a portion of an initial dental model and a target dental model of a patient's dental arch, in accordance with some embodiments of the invention.

FIG. 2 is a flow chart of a method of making the appliance 10 or 20 in accordance with some embodiments of the invention. As shown in FIG. 2, the method 2 starts with operation S01, where an initial dental model of a patient's dental arch in an initial tooth arrangement, a target dental model of the patient's dental arch in a target tooth arrangement, and a combined dental model derived from the initial dental model and the target dental model are provided. FIG. 3 is a schematic cross-sectional view of a portion of an initial dental model 30 and a target (or final) dental model 31 of a patient's dental arch, and FIG. 4 is a schematic cross-sectional view of a portion of a combined dental model 32 derived from combining the initial dental model 30 and the target dental model 31 (for the sake of simplicity and clarity, only one tooth of the patient requiring correction (hereinafter referred to as a first tooth T1) is shown in the figures), according to some embodiments of the invention. Using a computer simulated approach, an initial dental model 30 can be obtained by taking an impression of the patient's dental arch and digitally scanning the impression or by making directly an intraoral scan of the patient's mouth. Then, the digital target dental model 31 can be created using conventional computational manipulation of the digital initial dental model 30. The two models can be combined into a single digital model by a union procedure, where certain parts overlap. Subsequent steps of adding a block-out layer and designing a rigid shell can also be accomplished through computer manipulation to produce corresponding digital models. The resulting rigid shell model's 3D data can be sent to a computer manufacturing machine or 3D printer to produce the physical rigid shell. Alternatively, a manual approach can also be used to create a physical target dental model from a physical initial dental model. Individual teeth can be cut from the initial dental model and manipulated into the target position and fixed in place by wax. Also using wax, a block-out layer can be created by substantially covering the first tooth of the target dental model and extending the coverage to include the region where the first tooth of the initial dental model would occupy, thereby making a combined dental model. Briefly, the combined dental model is formed by superimposing the initial dental model and the target dental model, matching the unchanged parts. The purpose of the block-out layer is to define the shape of the rigid shell. The outer (or upper) surface of the block-out layer determines the shape of the inner (or lower) surface of the rigid shell.

Figure 5:
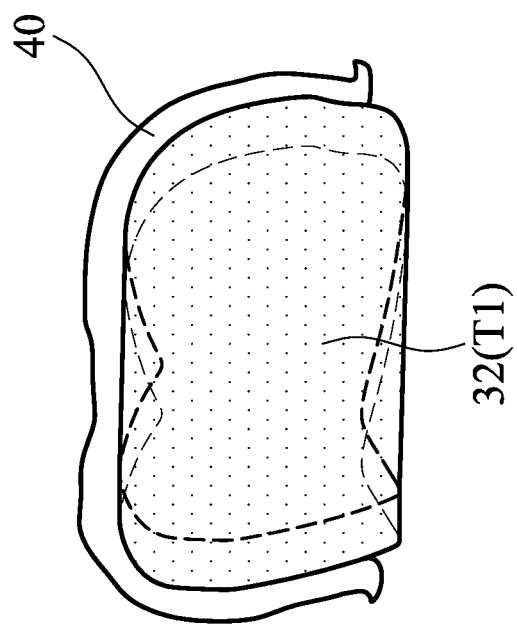
FIG. 5 is a schematic cross-sectional view showing that a block-out layer is formed over at least one first tooth (corresponding to at least one tooth of the patient needing orthodontic correction) of the combined dental model, in accordance with some embodiments of the invention.

In operation S02, a block-out layer is formed to cover at least one first tooth of the combined dental model. As shown in FIG. 5, after the combined dental model 32 is obtained, a block-out layer 40 is formed to cover at least one first tooth T1 of the combined dental model 32. The block-out layer 40 substantially covers the crown of the first tooth T1. In accordance with some embodiments, the block-out layer 40 may be a computer simulated layer or a physical wax layer extruded from the first tooth T1 of the combined dental model 32, as described above.

Figure 6:
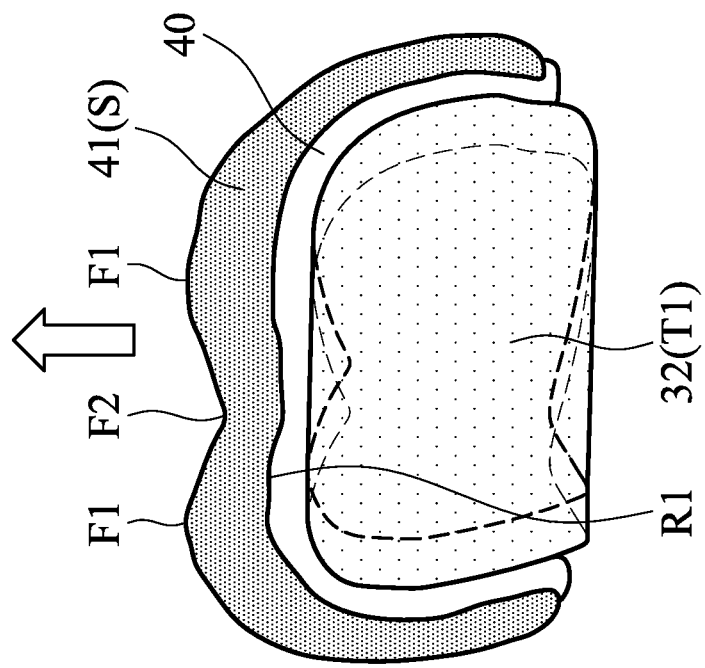
FIG. 6 is a schematic cross-sectional view showing that a first material layer is formed over the block-out layer and the combined dental model to form a rigid shell, in accordance with some embodiments of the invention.

In operation S03, a first material layer is formed over the block-out layer and the combined dental model to form a rigid shell. As shown in FIG. 6, after the block-out layer 40 is formed over the first tooth T1 of the combined dental model 32, a first material layer 41 is formed to cover the block-out layer 40 and the combined dental model 32. In accordance with some embodiments, the first material layer 41 may initially be in a liquid state and can flow to cover all exposed surfaces (for example, occlusal surface, labial surface, lingual surface and buccal surfaces) of the block-out layer 40 and the combined dental model 32. The first material layer 41 may be self-cured or undergo heat or light curing, depending on the material, to form a rigid shell S of the appliance 10 or 20. Note that the term "rigid shell" in this disclosure represents that it is not deformed or flexible even under loading from occlusal forces.

In accordance with some embodiments, the thickness of the rigid shell S of the appliance 10 or 20 can vary in the preferred range of 0.5 mm to 1.5 mm, sometimes more but not exceeding 2.0 mm. In accordance with some embodiments, the hardness of the rigid shell S of the appliance 10 or 20 is within the hardness range of resin splint materials and resin temporary denture materials, satisfying biological and mechanical requirements such as resistance to functional loads and wear for short to medium durations. The first material layer 41 comprises preferably acrylic resins, resin splint materials, or resin denture materials. Other material options may include elastomeric and thermoplastic materials.

After the rigid shell S of the appliance is formed, it is removed from the block-out layer 40 and the combined dental model 32, as the arrow indicates in FIG. 6. Through the above operations, the rigid shell S shaped by the block-out layer 40 and the combined dental model 32 forms at least one first cavity R1 with a space allowing the corresponding tooth (first tooth T1) of the patient needing correction to move from the initial tooth arrangement to the target (or final) tooth arrangement and at least one second cavity R2 (see the upper cavity in FIG. 10) fitting the shape of other tooth (second tooth) which does not require orthodontic movement.

Figure 7:
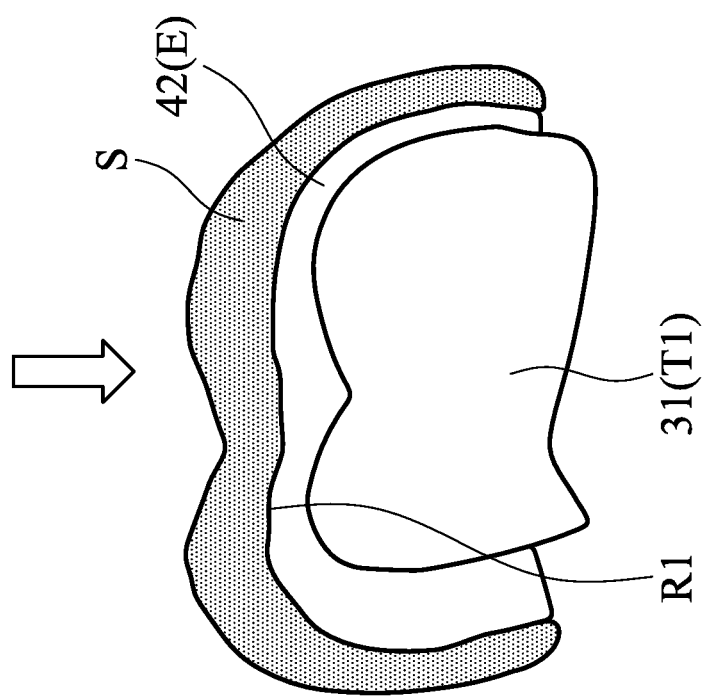
FIG. 7 is a schematic cross-sectional view showing that a second material layer is formed over at least one first tooth (corresponding to at least one tooth of the patient needing orthodontic correction) of the target dental model and that the rigid shell is placed against the second material layer and the target dental model, in accordance with some embodiments of the invention.

In operation S04, a second material layer is formed over at least one first tooth of the target dental model corresponding to the at least one first tooth of the combined dental model. As shown in FIG. 7, after the target dental model 31 is obtained, a second material layer 42 is formed over at least one first tooth T1 of the target dental model 31, wherein the at least one first tooth T1 of the target dental model 31 corresponds to the at least one first tooth T1 of the combined dental model 32. In accordance with some embodiments, the second material layer 42 initially can be spread to cover all exposed surfaces (for example, occlusal surface, lingual surface and buccal surface) of the at least one first tooth T1 of the target dental model 31. With a manual technique, the second material layer 42 may be built up with multiple applications of the material. Preferably, the second material layer 42 has a minimum thickness of 0.5 mm.

In accordance with some embodiments, the second material layer 42 comprises silicone-based soft denture relining materials. In accordance with some embodiments, the second material layer 42 may also comprise a shape-memory polymer. Shaping of the second material layer 42 against the target dental model determines the remembered shape of the shape-memory polymer. When heat activated, the shape memory polymer tries to return to its remembered shape, exerting weak forces on the first tooth, but not sufficient to move the first tooth of the patient. Under occlusal loading during mastication, the shape memory property provides the weak guiding force to direct the movement of the first tooth to the target position.

In operation S05, the rigid shell is placed against the second material layer and the target dental model to form at least one resilient member in the rigid shell. As shown in FIG. 7, in some embodiments, after the rigid shell S is placed against the second material layer 42, the second material layer 42 is allowed to settle and bond to the rigid shell S, to form at least one resilient member E in the corresponding first cavity R1 of the rigid shell S. In some alternative embodiments, after the second material layer 42 is formed over the at least one first tooth T1 of the target dental model 31, the rigid shell S shaped by the block-out layer 40 and the combined dental model 32 is placed against the second material layer 42 and the target dental model 31, and then the second material layer 42 is subjected to a curing treatment. Afterwards, the cured second material layer 42 forms at least one resilient member E in the rigid shell S which is affixed to the corresponding first cavity R1 of the rigid shell S. In particular, the resilient member E has a receiving shape fitting the corresponding first tooth T1 of the target dental model 31.

Figure 8:
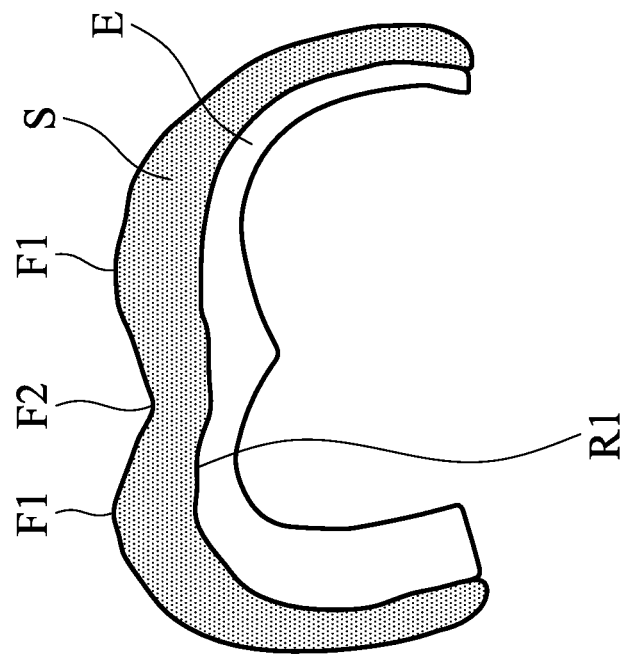
FIG. 8 is a schematic cross-sectional view of a dental appliance made using the method in FIG. 2, in accordance with some embodiments of the invention.

The method 2 ends with operation S06, wherein the rigid shell S with the resilient member E therein is removed from the target dental model 31 to obtain the dental appliance (see FIG. 8). As described above, the completed dental appliance (for example, the dental appliance 10 or 20 in FIG. 1) includes a rigid shell S for receiving the patient's teeth of the maxillary or mandibular dental arch, and at least one first cavity R1 of the rigid shell S which accommodates the corresponding tooth (first tooth) of the patient needing orthodontic correction has a resilient member E formed therein.

It should be understood that the method 2 described above is merely exemplary and the method of making a dental appliance used in the masticatory orthodontic correction device may include other operations and/or other sequences of operations. For example, a shaping process, such as a sculpting process is also performed at operation S03 or other suitable operations to form cusps and fossae features F1 and F2 (see FIGS. 6, 8, 10 and 11) on the occlusal surface of the rigid shell S and to form canine protection features F3 (see FIGS. 9 and 11) on buccal surfaces of the rigid shell S, so that a functional and safe occlusion between the dental appliance 10 worn on the maxillary dental arch 12 and the dental appliance 20 worn on the mandibular dental arch 22 of the patient during mastication can be achieved.

Figure 9:
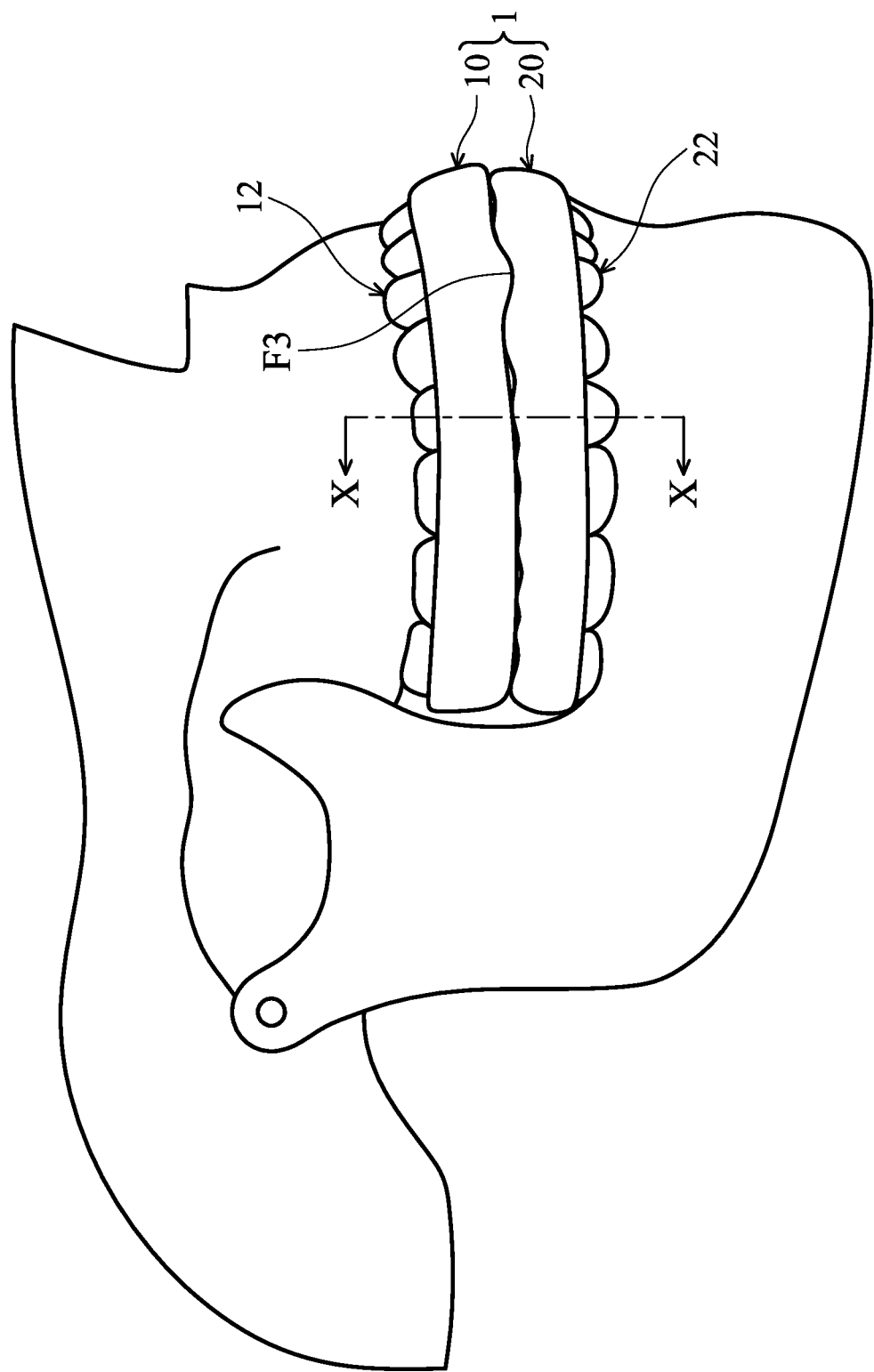
FIG. 9 is a schematic view illustrating the dental appliances in FIG. 1 in occlusion.

Next, the orthodontic correction mechanism of wearing the above masticatory orthodontic correction device 1 (i.e. the dental appliances 10 and 20) is described in the following paragraphs with reference to FIGS. 9-10. FIG. 9 is a schematic view illustrating the dental appliances 10 and 20 in FIG. 1 in occlusion, and FIG. 10 is a cross-sectional view taken along the line X-X in FIG. 9.

It should be appreciated that the teeth receiving surface (on the opposing side of the occlusal surface) of the rigid shell S of each dental appliance 10 or 20 forms several cavities for receiving the patient's teeth. These cavities may be divided into two types: one type is the first cavity R1 configured to receive a tooth (first tooth T1) which requires orthodontic correction, and the other type is the second cavity R2 configured to receive other tooth (second tooth T2) which does not require orthodontic correction or movement. As an example (see FIG. 10), the second cavity R2 of the dental appliance 10 matches the shape of the second tooth T2 of the maxillary dental arch 12, and the first cavity R1 of the dental appliance 20 has a space allowing the first tooth T1 of the mandibular dental arch 22 to move therein. Specifically, the first cavity R1 (formed by the method 2 described above) has a space allowing the first tooth T1 in malposition to move from its initial tooth arrangement to its target (or final) tooth arrangement. In particular, the space of the first cavity R1 is greater than a combined space (i.e. the first tooth T in the combined dental model 32) defined by the first tooth T1 in the initial dental model 30 and the first tooth T1 in the target dental model 31 (see FIG. 6). In accordance with some embodiments, the width of the space of the first cavity R1 is greater than the width of the combined space of the first tooth T1, as shown in FIG. 6.

In addition, a resilient member E formed in the first cavity R1 is elastic and deformable and accommodates the first tooth T1 in malposition. In particular, the resilient member E (formed by the method 2 described above) has a receiving shape fitting the first tooth T1 of the target dental model 31, before the appliance is worn (see FIG. 7).

Figure 10:
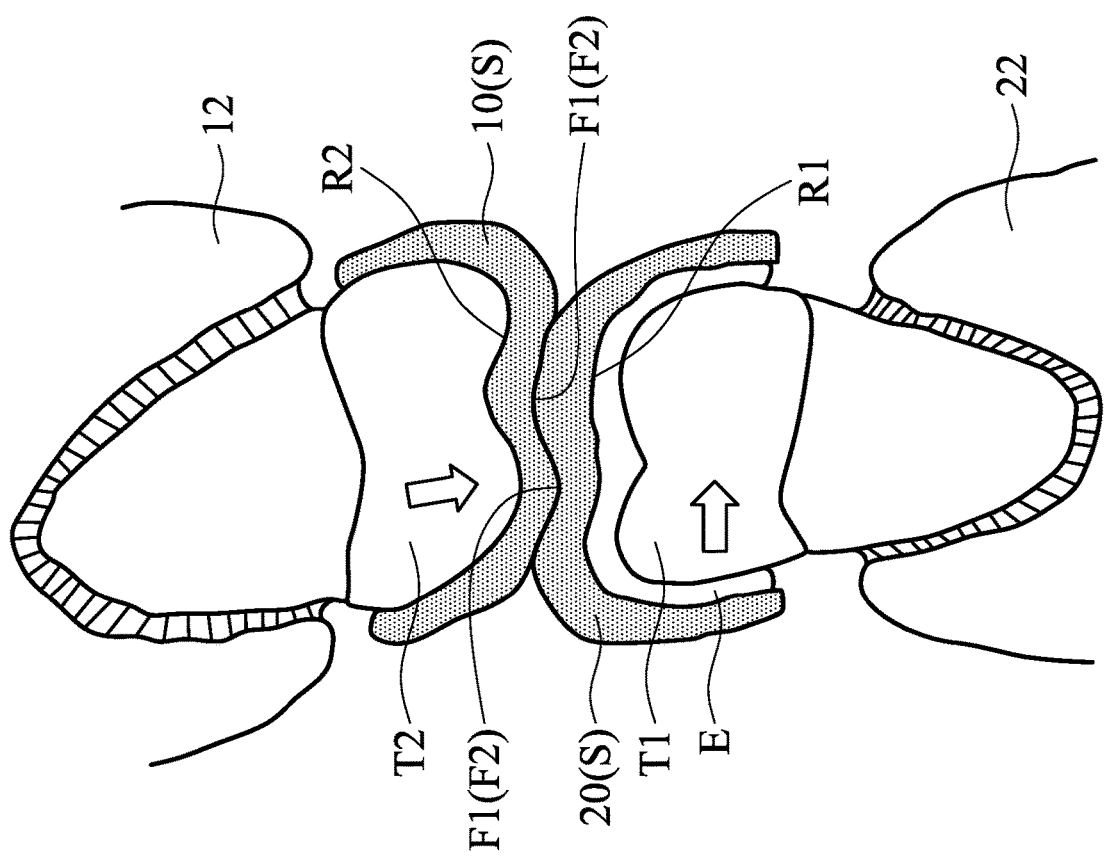
FIG. 10 is a cross-sectional view taken along the line X-X in FIG. 9.

When the patient wears the first and second dental appliances 10 and 20 to masticate as shown in FIGS. 9 and 10, loading from the occlusion of the maxillary and mandibular dental arches 12 and 22 during mastication is transferred from the dental appliances 10 and 20 to the teeth and further to the periodontal ligament and the adjacent alveolar bone of each tooth.

Specifically, occlusal force is exerted on the second teeth T2 during mastication. Occlusal loads are transmitted from the dental appliances 10 and 20 to each second tooth T2 through the second cavity R2 in direct contact with the second tooth T2, spreading the load. The dental appliances 10 and 20 hold and connect the second teeth T2 through the second cavities R2, restricting tooth movement.

On the other hand, the first cavity R1 has a space allowing the first tooth T1 to move therein. Under loading from occlusion, the occlusal force is transmitted through the second teeth and supporting tissue, causing movement of the adjacent first tooth T1 in the first cavity R1. Also, the resilient member E has a receiving shape fitting the first tooth T1 in its target (or final) tooth arrangement (i.e. the first tooth T1 of the target tooth model 31), so that the resilient member E guides the movement of the first tooth T1 in malposition toward the envisioned target or final position during mastication. More specifically, when the first tooth T1 in malposition is initially placed in the first cavity R1, it causes the resilient member E to deform to accommodate the first tooth T1 and cover a surface of the crown. The deformed resilient member E tries to return to its original shape, exerting weak force on the first tooth T1, but not sufficient to move the first tooth T1. Under occlusal loading during mastication, the first tooth T1 starts to move and the resilient member E provides the weak guiding force to direct the movement of the first tooth T1 to the target position.

It should be noted that the working principle of the masticatory orthodontic correction device 1 described above is clearly different from that of braces and clear aligners used in prior art. Orthodontic tooth movement is a process wherein mechanical force is applied to a tooth to cause bone remodeling. Tooth movement in the alveolar bone is actually the formation of new bone on the tension side of the periodontal ligament and bone resorption on the compression side. Light force is desirable because bone resorption occurs directly with less cell death, allowing a tooth to move through the alveolar bone more easily. Heavy and continuous force is undesirable because cell death in the periodontal ligament halts tooth movement and the long duration of the root surface of the tooth contacting the wall of the alveolar socket increases root resorption risks. With traditional braces, the orthodontic wire is fixed to brackets attached to the teeth, applying constant force on the teeth. In the case of clear aligners used in prior art, the body of the aligner is flexible and applies resilient force on the tooth in malposition, also in a constant way over 20 hours per day. In contrast, the rigid shell of the dental appliance of the embodiments of the present invention is not flexible and does not deform when the appliance is worn during mastication. The masticatory orthodontic correction device relies on intermittent short-duration occlusal forces generated during mastication for the applied orthodontic force, reducing the time and discomfort of wearing the device while accelerating orthodontic tooth movement.

Furthermore, the device 1 of the embodiments is designed to be used during mastication when its orthodontic correction function is activated by occlusal loading. Therefore, for the device 1 to be functional, it requires features that establish functional occlusion during mastication. For an occlusion to be functional, the maxillary and mandibular teeth should contact in an efficient way without producing trauma for all movements of the jaw during mastication. In particular, functional occlusion requires that the jaw can move comfortably for all masticatory movements. In the case of the embodiments described above, occlusion takes place through the contact of the worn dental appliances, and the occlusal surfaces of the dental appliances should have features that establish functional occlusion.

Figure 11:
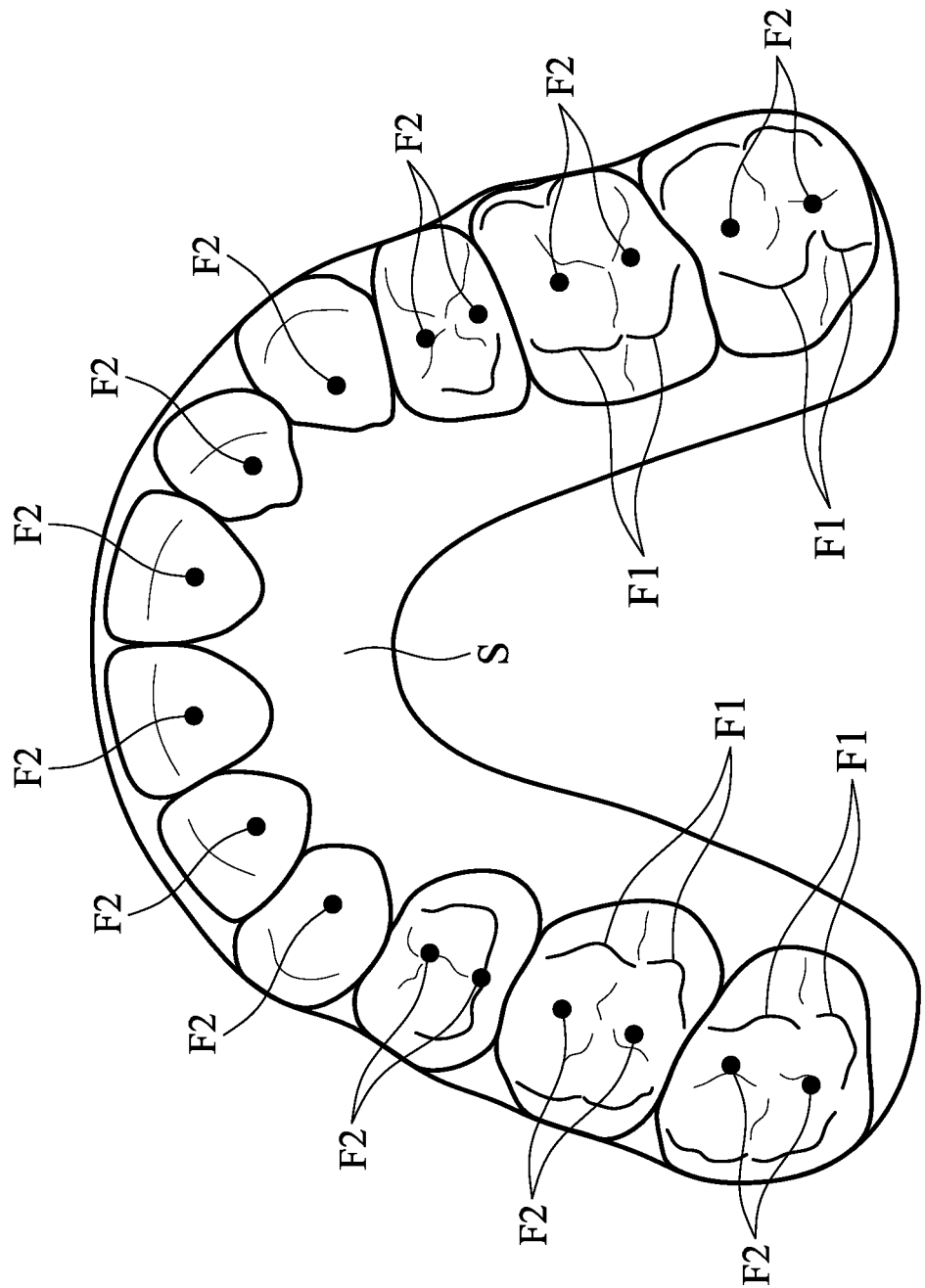
FIG. 11 is a schematic view illustrating the occlusal features on the occlusal surface of one of the dental appliances in FIG. 9, in accordance with some embodiments.

FIG. 11 is a schematic view illustrating the occlusal features on the occlusal surface of the dental appliance 10 or 20 in FIG. 9, in accordance with some embodiments. As shown in FIG. 11, cusps and fossae features F1 and F2 are formed on the occlusal surface of the rigid shell S of the dental appliance 10 or 20, and in a preferred embodiment, all the fossae features F2 are distributed in a curve (e.g. a parabola). In addition, when the first and second dental appliances 10 and 20 make contact, the cusps features F1 of one dental appliance contact the fossae features F2 of the other dental appliance, and vice versa (see FIG. 10). Accordingly, when the patient wears the first and second dental appliances 10 and 20 to masticate, the occlusal points of the first and second dental appliances 10 and 20 (i.e. cusps and fossae features F1 and F2) preferably contact each other simultaneously and separate from each other simultaneously. Also, occlusion occurs with the maximum effective contact area without slipping or other damaging movements, and pressure is more evenly distributed. Consequently, the effectiveness of correction and comfort of the patient wearing the first and second dental appliances 10 and 20 are improved.

Figure 12:
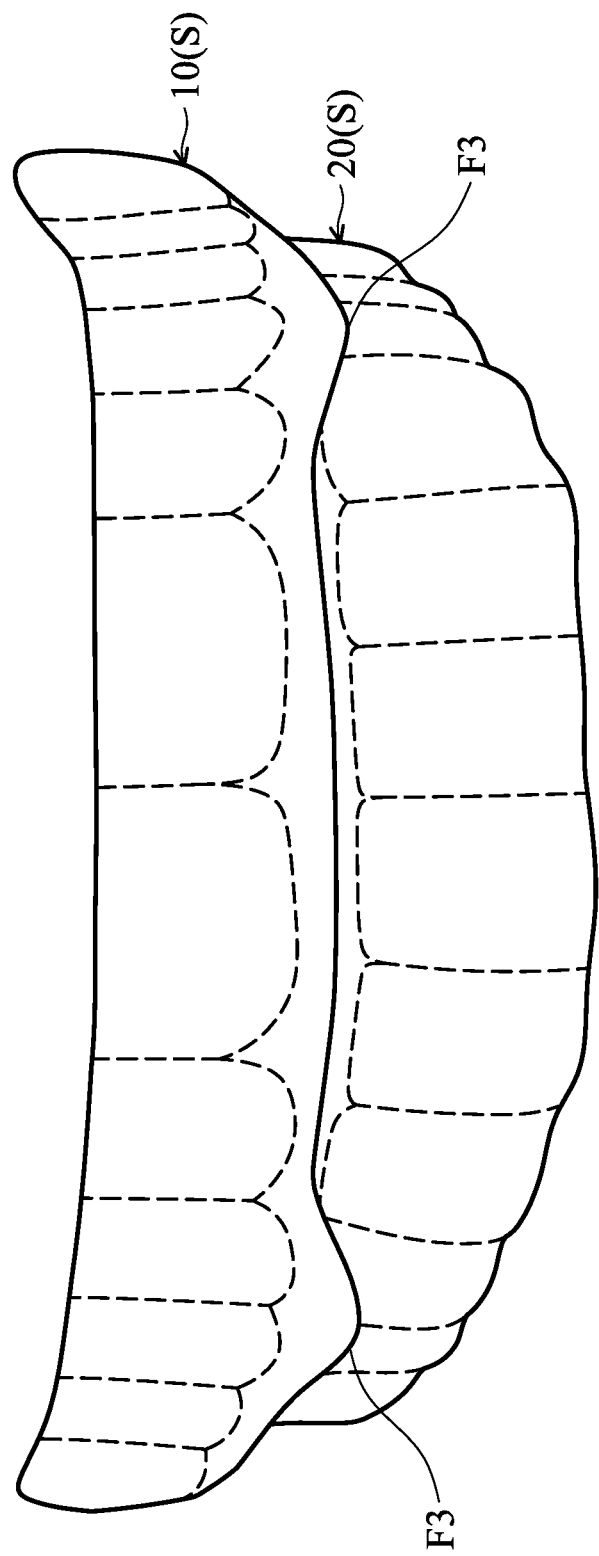
FIG. 12 is a schematic view of the first and second dental appliances in FIG. 9 from another viewing angle.

FIG. 12 is a schematic view of the first and second dental appliances 10 and 20 in FIG. 9 from another viewing angle. As shown in FIG. 12, the first dental appliance 10 further has several (e.g. two) canine protection features F3 formed on the left and right buccal surfaces of its rigid shell S. Each canine protection feature F3 form a guiding surface on the lingual side thereof (not shown) for guiding the second dental appliance 20. Accordingly, the canine protection features F3 limit the movement range of the second dental appliance 20 relative to the first dental appliance in the horizontal direction during mastication.

Although the masticatory orthodontic correction device 1 described above includes two dental appliances 10 and 20, it may also include a single dental appliance placed on the maxillary or mandibular dental arch with at least one tooth in malposition. For example, when the patient's teeth in malposition are maxillary teeth, he can wear a single dental appliance on his maxillary dental arch. Conversely, the patient can wear a single dental appliance on his mandibular dental arch. When the patient wears a single dental appliance on one dental arch, the dental appliance and the opposing dental arch can establish functional occlusion through cusps and fossae features on their occlusal surfaces.

A method of using the above devices to perform orthodontic correction is also provided in some embodiments of the invention, including: having the patient wear the first and second dental appliances or one dental appliance on just one of the dental arches, and having the patient masticate for 15 to 20 minutes. Mastication can take place during meals, occurring three times a day, for a total of one hour of wear time. Occlusal loads generated during mastication provide the driving force enabling the devices to function as orthodontic correction devices.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method of making a dental appliance for repositioning a patient's teeth, wherein the dental appliance is adapted to be worn during mastication, the method comprising:
    forming a rigid shell that is configured to receive the patient's teeth of a dental arch, wherein the rigid shell has a rigidity such that it does not deform even under loading from occlusal forces generated during mastication, wherein the rigid shell has at least one first cavity with a space for accommodating at least one first tooth of the dental arch needing orthodontic correction and allowing the first tooth to move from an initial tooth arrangement to a target tooth arrangement; and
    forming at least one resilient member in the first cavity of the rigid shell, wherein the resilient member has a receiving shape fitting the first tooth in the target tooth arrangement, wherein the first tooth causes the resilient member to deform and when the deformed resilient member tries to return to its original shape, a resilient restoring force of the resilient member is not sufficient to move the first tooth.

2. The method as claimed in claim 1, wherein the step of forming the rigid shell further comprising:
    providing a target dental model of the dental arch of the patient in the target tooth arrangement, and providing a combined dental model derived by combining the target dental model and an initial dental model of the dental arch of the patient in the initial tooth arrangement;
    forming a block-out layer to cover at least one first tooth of the combined dental model; and
    forming a first material layer over the block-out layer and the combined dental model to form the rigid shell, wherein the block-out layer determines a shape of an inner surface of the rigid shell.

3. The method as claimed in claim 2, wherein the step of forming the resilient member in the rigid shell further comprising:
    forming a second material layer over at least one first tooth of the target dental model corresponding to the first tooth of the combined dental model; and
    placing the rigid shell against the second material layer and the target dental model to form the resilient member in the first cavity of the rigid shell.

4. The method as claimed in claim 3, wherein the step of forming the resilient member in the rigid shell further comprising:
    placing the rigid shell against the second material layer to allow the second material layer to settle or cure over the at least one first tooth of the target dental model and bond to the rigid shell to form the resilient member in the first cavity of the rigid shell.

5. The method as claimed in claim 3, wherein the second material layer comprises soft silicone-based denture relining materials.

6. The method as claimed in claim 3, wherein the second material layer comprises shape memory polymers.

7. The method as claimed in claim 2, wherein the step of forming the rigid shell further comprising:
    curing the first material layer over the block-out layer and the combined dental model to form the rigid shell.

8. The method as claimed in claim 2, wherein the first material layer comprises acrylic resin, resin splint materials, or resin denture materials.

9. The method as claimed in claim 1, further comprising:
    shaping the rigid shell to form cusps and fossae features on an occlusal surface of the rigid shell.

10. The method as claimed in claim 1, further comprising:
    shaping the rigid shell to form canine protection features on buccal surfaces of the rigid shell, wherein the canine protection features each has a guiding surface on its lingual side.

11. A dental appliance for repositioning a patient's teeth, wherein the dental appliance is adapted to be worn during mastication, the dental appliance comprising:
    a rigid shell configured to receive the patient's teeth of a dental arch, wherein the rigid shell has a rigidity such that it does not deform even under loading from occlusal forces generated during mastication, wherein the rigid shell has at least one first cavity with a space for accommodating at least one first tooth of the dental arch needing orthodontic correction and allowing the first tooth to move from an initial tooth arrangement to a target tooth arrangement; and
    at least one resilient member formed in the first cavity and having a receiving shape fitting the first tooth in the target tooth arrangement, arranged and configured such that when the first tooth is accommodated in the space, the first tooth causes the resilient member to deform, wherein a resilient restoring force of the resilient member alone is not sufficient to move the first tooth when so accommodated, and under occlusal loading during mastication, the resilient restoring force of the resilient member guides the first tooth from the initial tooth arrangement to the target tooth arrangement.

12. The dental appliance as claimed in claim 11, wherein the rigid shell further has at least one second cavity fitting the shape of at least one second tooth of the dental arch which does not require orthodontic correction or movement.

13. The dental appliance as claimed in claim 11, wherein the rigid shell further includes cusps and fossae features on an occlusal surface thereof.

14. The dental appliance as claimed in claim 11, wherein the rigid shell further includes canine protection features on buccal surfaces of the rigid shell, and the canine protection features each has a guiding surface on its lingual side.

* * * * *